United States Patent Office

3,772,229
Patented Nov. 13, 1973

3,772,229

PRODUCTION OF POLYESTERAMIDES FROM AZIRIDINE SALTS

Ray C. Christena, Wichita, and Earnest L. Johnston, Clearwater, Kans., assignors to Vulcan Materials Company, Birmingham, Ala.

No Drawing. Continuation-in-part of applications Ser. No. 68,492, now Patent No. 3,676,291, and Ser. No. 68,493, now Patent No. 3,676,424, both Aug. 31, 1970. This application July 22, 1971, Ser. No. 165,323
Int. Cl. C08g *20/30*
U.S. Cl. 260—22 R 26 Claims

ABSTRACT OF THE DISCLOSURE

An aziridine salt represented by the structural formula:

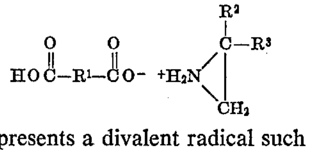

wherein $R^1$ represents a divalent radical such as alkylene, arylene, or aralkylene, wherein one or all of the hydrogen atoms thereof can be substituted with F, Cl, Br, lower alkyl and/or lower alkoxy; and where $R^2$ and $R^3$ represent monovalent radicals such as hydrogen, alkyl, or aryl;

is reacted with a polycarboxylic acid, such as maleic or dimer acid, and with a polyhydric alcohol, such as castor oil or 1,6-hexane diol, to form a polyesteramide represented by the structural formula:

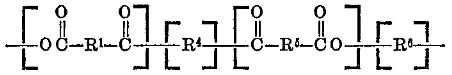

wherein $R^1$ has the meaning given above; $R^4$ represents a divalent radical such as aminoalkyleneoxy or oxyalkyleneamino; $R^5$ represents a divalent radical such as alpha-beta ethylenically unsaturated alkylidene; and $R^6$ represents a divalent radical such as alkylene or alkylidene.

The above aziridine salt may also be reacted with an acid represented by the structural formula $$HO\overset{O}{\overset{\|}{C}}-R^1-\overset{O}{\overset{\|}{C}}OH,$$

wherein $R^1$ has the meaning given above, to yield a diacid represented by the structural formula $$HO\overset{O}{\overset{\|}{C}}-R^1-\overset{O}{\overset{\|}{C}}-R^4-\overset{O}{\overset{\|}{C}}-R^1-\overset{O}{\overset{\|}{C}}OH$$

where $R^4$ has the meaning given above.

The above diacid may then be reacted with the polycarboxylic acid and the polyhydric alcohol to form a polyesteramide represented by the structural formula

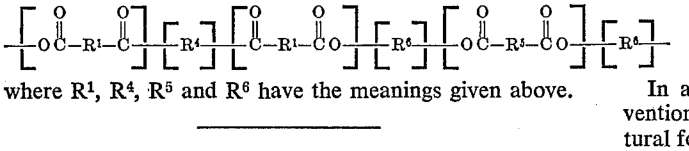

where $R^1$, $R^4$, $R^5$ and $R^6$ have the meanings given above.

CROSS REFERENCE TO RELATED APPLICATIONS

This is a continuation-in-part of copending applications Ser. Nos. 68,492 and 68,493, both filed Aug. 31, 1970, now U.S. Patents 3,676,291 and 3,676,424, respectively.

BACKGROUND OF THE INVENTION

Field of the invention

This invention relates to polyesteramides.

Summary of the prior art

Since their discovery, synthetic resins or polymers such as the polyamides, polyesters, and polyesteramides have found application in industries and scientific disciplines in many forms such as coatings, shaped articles and binders. See, for example, U.S. Pats. 2,463,977, 2,490,001–005, 2,495,172, 2,523,999, 2,806,822, 3,036,974 and 3,354,126; and French Pat. 1,547,058. However, the search has continued, particularly in the area of glass fiber-reinforced plastic articles, for ways to produce polymers which are resistant to existing and anticipated destructive elements and forces to be encountered in their environments. For example, new ways are needed to produce polymers suitable for use in fire-retardant coatings, and impact resistant glass fiber-reinforced plastic articles such as boat hulls, where adhesiveness or bonding between the glass fibers and the polymer matrix is important.

SUMMARY OF THE INVENTION

Accordingly, a general object of the present invention is to provide polymers having desired characteristics as discussed above. Other and more particular objects of the present invention will become apparent to one skilled in the art from the following summary of the invention and description of the preferred embodiments:

In accordance with one aspect of the present invention, a process is provided for producing polyesteramides. This process involves coreacting:

(A) at least one member of the group consisting of an aziridine salt which may be represented by the structural formula

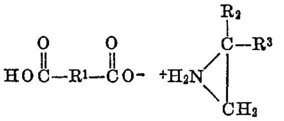

and a diacid which may be represented by the structural formula $$HO\overset{O}{\overset{\|}{C}}-R^1-\overset{O}{\overset{\|}{C}}-R^4-\overset{O}{\overset{\|}{C}}-R^1-\overset{O}{\overset{\|}{C}}OH$$

(B) a polycarboxylic acid or an acid anhydride thereof; and (C) a polyhydric alcohol.

In the above structural formulas, $R^1$ represents a divalent radical which may be alkylene, arylene, or alkylene, wherein one or all of the hydrogen atoms thereof can be substituted with one or more members selected from the group consisting of F, Cl, Br, lower alkyl and lower alkoxy; $R^2$ and $R^3$ represent monovalent radicals which may independently be selected from the group consisting of hydrogen, alkyl, and aryl; and $R^4$ represents a divalent radical which may be aminoalkyleneoxy or oxyalkyleneamino.

In accordance with another aspect of the present invention, the diacid represented by the above shown structural formula is provided, preferably by reacting the aziridine salt of the above shown structural formula with an acid which may be represented by the structural formula $$HO\overset{O}{\overset{\|}{C}}-R^1-\overset{O}{\overset{\|}{C}}OH$$

where $R^1$ has the meaning given above.

In accordance with another aspect of the present invention, a polyesteramide having repeating units which may be represented by the structural formula $$\left[-O\overset{O}{\overset{\|}{C}}-R^1-\overset{O}{\overset{\|}{C}}-\right]\left[-R^4-\right]\left[-\overset{O}{\overset{\|}{C}}-R^1-\overset{O}{\overset{\|}{C}}O-\right]\left[-R^6-\right]\left[-O\overset{O}{\overset{\|}{C}}-R^5-\overset{O}{\overset{\|}{C}}O-\right]\left[-R^6-\right]$$

is provided. In this structural formula, $R^1$ and $R^4$ have the meanings given above, while $R^5$ represents a divalent radical such as alpha-beta ethylenically unsaturated alkylidene and $R^6$ represents a divalent radical such as alkylene or alkylidene.

These and other aspects of the present invention will be more fully apparent to one skilled in the art from the following description of the preferred embodiments:

DESCRIPTION OF THE PREFERRED EMBODIMENTS

The aziridine salt

The aziridine salts used to prepare the polyesteramides may be represented by the general formula:

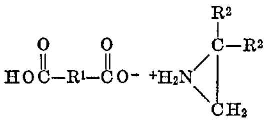

$R^1$ represents a divalent organic radical such as alkylene, arylene, or aralkylene, wherein one or all of the hydrogen atoms thereof can be substituted with one or more members selected from the group consisting of F, Cl, Br, lower alkyl, and lower alkoxy. $R^2$ and $R^3$ represent monovalent organic radicals which are independently selected from the group consisting of hydrogen, alkyl, and aryl. The alkyl and alkylene groups or portions of the groups may contain, for example, from 1 to 15 carbon atoms.

In one preferred embodiment of the present invention $R^1$ is lower alkylene or phenylene, $R^2$ is hydrogen or methyl and $R^3$ is hydrogen.

In another preferred embodiment of the present invention wherein the salts are especially useful to produce flame retardant polyesteramides as described more completely below, $R^1$ is tetrachlorophenylene, tetrabromophenylene, or a radical represented by the structural formula

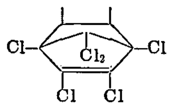

by which is meant the residue of 1,4,5,6,7,7-hexachlorobicyclo[2.2.1]-5-heptene - 2,3 - dicarboxylic acid commercially available as chlorendic acid under the "Het" Acid trademark of Hooker Chemical Corporation. In this embodiment $R^2$ is hydrogen or methyl and $R^3$ is hydrogen.

The aziridine salts may be produced by co-reacting at least one dicarboxylic acid represented by the general formula:

$$HO\overset{O}{\overset{\|}{C}}-R^1-\overset{O}{\overset{\|}{C}}OH$$

with at least one aziridine compound represented by the general formula:

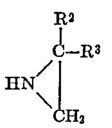

wherein $R^1$, $R^2$ and $R^3$ may have the above described meanings.

The above represented dicarboxylic acids should be free of non-benzenoid unsaturation, in order to inhibit undesirable reactions with the aziridine compound. For example, maleic acid is not within the scope of such acids. And unlike many reactions employing dicarboxylic acids, in this reaction the acid anhydrides are not equivalents and the term "acid" employed in connection with the dicarboxylic acids is meant to refer to the acid containing two carboxyl groups and not to the corresponding anhydride.

Non-limiting examples of suitable dicarboxylic acids include among other malonic acid, succinic acid, glutaric acid, adipic acid, azelaic acid, brassylic acid, phthalic acid, terephthalic acid, isophthalic acid, 1,8-naphthalenedicarboxylic acid, araliphatic dicarboxylic acids such as p,p'-benzophenonedicarboxylic acid, and 3-methyl phthalic acid, hemipic acid, 3-bromophthalic acid, 4-chloroisophthalic acid, tetrabromophthalic acid, tetrachlorophthalic acid, and chlorendic acid.

Non-limiting examples of suitable aziridine compounds include among others ethyleneimine (aziridine), 2-methyl aziridine, 2-phenyl aziridine, 2,2-dimethyl aziridine, 2-benzyl aziridine and 2-dodecyl aziridine. Ethyleneimine is preferred because of cost, availability, and reactivity, although 2-methyl aziridine has also been found to be suitable for certain specialized applications.

The reaction between the dicarboxylic acid and the aziridine compound is most conveniently effected by simply adding the aziridine compound to the acid at any convenient temperature, but generally between −20° and 100° C. and preferably between 0° and 50° C. At lower temperatures, the reaction proceeds at an uneconomically slow rate whereas at higher temperatures the salt tends to rearrange to an imino ester or hydroxy amide. The reaction is preferably conducted in the presence of a suitable solvent which is inert to the acid and the aziridine compound. Examples of suitable solvents include among others ethanol, methanol, xylene, dioxane, toluene, chlorobenzene, ethylene dichloride, and acetone, which is preferred. The solvent can be present in any amount up to infinite dilution. The aziridine compound is preferably added to the acid in a molar ratio of 10:10 although slightly varying molar ratios such as 10:11 to 11:10 can also be employed. At lower molar ratios insufficient aziridine is present in order to completely convert the acid to the aziridine salt whereas at greater ratios competing side reactions occur undesirably reducing the yield of the salt.

The diacid $HOOCR^1COR^4COR^1COOH$

The diacids used to prepare the polyesteramides may be represented by the general formula $$HO\overset{O}{\overset{\|}{C}}-R^1-\overset{O}{\overset{\|}{C}}-R^4-\overset{O}{\overset{\|}{C}}-R^1-\overset{O}{\overset{\|}{C}}OH$$

$R^1$ has the meaning given above, and $R^4$ represents a divalent organic radical such as aminoalkyleneoxy or oxyalkyleneamino. The alkylene portions of the groups may contain, for example, from 2 to 15 carbon atoms.

$R^1$ is preferably tetrachlorophenylene, tetrabromophenylene, or the radical represented by the structural formula

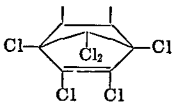

In this embodiment, $R^4$ is preferably aminoethyleneoxy, oxyethyleneamino, aminoisopropyleneoxy or oxyisopropyleneamino, i.e., $R^4$ may be represented by the general formulas $$-NHCH_2\overset{R^7}{\overset{|}{C}}HO- \quad \text{and} \quad -O\overset{R^7}{\overset{|}{C}}HCH_2NH-$$

where $R^7$ is hydrogen or methyl. In the most preferred embodiment, $R^4$ is aminoethyleneoxy or oxyethyleneamino, i.e., $R^7$ is hydrogen.

The diacid is preferably produced by coreacting at least one of the above discussed aziridine salts with at least one of the above discussed dicarboxylic acids represented by the general formula $HOOCR^1COOH$.

The reaction between the aziridine salt and the dicarboxylic acid is most conveniently effected by simply adding or mixing the aziridine salt with the dicarboxylic acid at any convenient temperature at which the reaction proceeds at a measurable rate. Typically, this temperature is between about 0 and 200° C., preferably between about 40° and 180° C. The reaction may be conducted in the presence of a suitable solvent which is inert to the aziridine salt and the dicarboxylic acid. Examples of suitable solvents include among others toluene, dioxane, xylene and acetone. The solvent may be present in any amount up to infinite dilution. The aziridine salt is preferably reacted with the carboxylic acid in substantially stoichiometric proportions, i.e., at a molar ratio of 10:10, although slightly varying molar ratios such as 10:11 to 11:10 may also be employed.

Polyesteramide production

According to another aspect of the present invention there is provided an improved process for producing polyesteramides comprising coreacting the aziridine salt and/or the diacid with at least one polyhydric alcohol and at least one polycarboxylic acid or polycarboxylic acid anhydride thereof.

In the broadest aspect of the present invention any polycarboxylic acid or anhydride thereof can be employed. However, dicarboxylic acids and anhydrides thereof are preferred when it is desired to produce linear polyesteramides. Examples of certain dicarboxylic acids free of non-benzenoid unsaturation are given above. Their corresponding anhydrides such as phthalic anhydride can also be employed. In an especially preferred embodiment of the present invention, the dicarboxylic acid or anhydride is alpha-beta ethylenically unsaturated in order to render the polyesteramide cross-linkable with a vinyl monomer. Examples of suitable alpha-beta unsaturated dicarboxylic acids include among others glutaconic acid, itaconic acid, citraconic acid, mesaconic acid, fumaric acid and maleic acid which is preferred. Dimer acid, typically produced by dimerization of unsaturated fatty acids at mid-molecule and usually containing 36 carbon atoms, may also be used, particularly in combination with maleic acid or anhydride, and particularly where improved impact strength of the resulting polyesteramide is desired. Tri- or higher functional acids such as trimesic acid can be employed when it is desired to produce a branched or cross-linked polyesteramide.

In the broadest aspects of the present invention, any polyhydric alcohol can be employed although the dihydric alcohols are preferred when it is desired to produce linear polyesteramides.

Typically, the dihydric alcohols have from 2 to 6 carbon atoms.

Examples of suitable polyhydric alcohols include among others ethylene glycol, diethylene glycol, 1,2-propylene glycol, dipropylene glycol, 1,3-propylene glycol, 1,3-butylene glycol, 1,2-butylene glycol, neopentyl glycol, 1,3-pentanediol, 1,2-butenediol, 1,5-pentanediol, and 1,6-hexanediol. Particularly preferred are the alkanediols of from 5 to 6 carbon atoms, insofar as the longer chain diols have been found to give improved impact strength. Higher polyhydric alcohols such as trimethylol propane and pentaerythritol can be used in minor amounts which do not materially alter the linear nature of the polyesteramide.

Castor oil, which is chiefly ricinolein, is another polyhydric alcohol which may be used, and can be especially advantageous where improved impact strength of the resulting polyesteramide is desired.

The following generalized equation illustrates the reaction which is thought to occur in forming a polyesteramide by reacting the aziridine salt, a dicarboxylic acid and a dihydric alcohol:

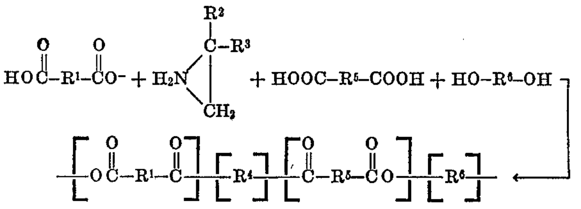

$R^1$, $R^2$, $R^3$ and $R^4$ have the meanings given above; $R^5$ represents a divalent organic radical such as alpha-beta ethylenically unsaturated alkylidene; and $R^6$ represents a divalent organic radical such as alkylene or alkylidene.

Preferably, $R^5$ is a divalent organic radical represented by the formula $$-CH{=}\overset{R^8}{\overset{|}{C}}- \quad \text{or} \quad -\overset{R^8}{\overset{|}{C}}{=}CH-$$

where $R^8$ is hydrogen or lower alkyl, preferably methyl, $R^8$ is most preferably hydrogen.

Preferably, $R^6$ is lower alkylene or lower alkylidene.

The following generalized equation illustrates the reaction which is thought to occur in forming a polyesteramide by reacting the diacid $$HOOCR^1COR^4COR^1COOH$$

a dicarboxylic acid $HOOCR^5COOH$ and a dihydric alcohol $HOR^6OH$:

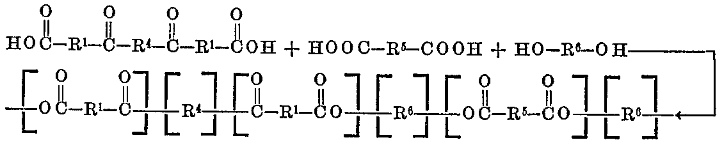

$R^1$, $R^4$, $R^5$ and $R^6$ have the meanings given above.

The brackets in the above formulas are meant to indicate a linear polymer having recurring ester and amide linkages in the backbone thereof. The brackets are not meant to indicate that the reactants which produce these recurring units must necessarily be present in the preferred ratio of 1:1:1.

The polyesteramides are produced by combining the coreactants in a reaction vessel and heating it to any temperature at which the reaction proceeds at an economical rate. This is generally between zero and 200° C. and preferably between 40° and 180° C. When it is desired to achieve a high molecular weight, the ratio of the polycarboxylic acid to the polyhydric alcohol may be critical and generally is between 15:10 and 10:15 and preferably between 11:10 and 10:11. The aziridine salt and the diacid $HOOCR^1COR^4COR^1COOH$ may be employed in somewhat more widely varying molar ratios, but are generally present in a molar ratio of 10:1 to 1:10 and preferably 3:1 to 1:3 moles of salt or diacid per mole of dicarboxylic acid $HOOCR^5COOH$. In that preferred embodiment of the present invention wherein the polyesteramides are intended to be self-extinguishing, a salt of a chlorinated or brominated acid is employed in an amount such that the total polyesteramide or its mixture with a vinyl monomer has a halogen content of greater than 10 weight percent and preferably greater than 20 weight percent. The reactants can be charged sequentially to the vessel but advantageously may be charged simultaneously in order to produce a random polyesteramide and maximize molecular weight, thus resulting in greater impact strength for the polyesteramide. When the reactants are not charged simultaneously, the diacid $HOOCR^1COR^4COR^1COOH$ is preferably used in lieu of the aziridine salt, and most preferably is generated or produced in situ from the aziridine salt, so as again to maximize molecular weight and impact strength. The use of the diacid, either by generating it in situ or by adding it directly to the reaction zone has also been found to improve color and storage stability of the resulting polyesteramides. The reaction is continued until a stoichiometric amount of water has been removed or more preferably until the acid number of the reaction mixture has dropped to a value below 100 and preferably below 50 and also until the amine number of the reaction mixture has dropped to a value below 20 and preferably below 10.

The reaction is usually conducted in the presence of an inert atmosphere of nitrogen, argon or the like, under substantially oxygen-free conditions, i.e., an atmosphere containing less than 20 p.p.m. oxygen and preferably less than 10 p.p.m. oxygen. The reaction is conveniently conducted at atmospheric pressure, but if desired may be conducted at superatmospheric or subatmospheric pressures, and in a batch, semi-continuous, or continuous manner.

Polyesteramides produced in accordance with that preferred embodiment of the present invention employing an alpha-beta ethylenically unsaturated acid can be crosslinked with copolymerizable vinyl monomers.

Examples of suitable vinyl monomers include among others vinyl toluene, acrylic acid, methyl acrylate, 2-ethylhexyl acrylate, acrylonitrile, methyl methacrylate, n-butyl acrylate, mono-chlorostyrene, ethyl acrylate, ethyl methacrylate, acrolein, vinyl acetate, vinylidene chloride, vinyl chloride, vinyl bromide, and styrene which is preferred because of costs, availability and reactivity and the fact that it does not adversely affect the physical properties of cured compositions of these polyesteramides. The polyesteramide and the vinyl monomer can be mixed in widely varying weight ratios such as 1:10 to 10:1 but are preferably combined in ratios of 3:1 to 1:3. In a preferred embodiment of the present invention wherein the mixture of polyesteramide and vinyl monomer when cured must be flame retardant the polyesteramide and the vinyl monomer are mixed in a quantity such that the halogen content of the mixture is greater than 10 and preferably greater than 20 weight percent.

In order to maintain the stability of the mixture of the polyesteramide and vinyl monomer it is conventional to employ a free radical trap such as hydroquinone. In order to cure these compositions, a free radical initiator such as benzoyl peroxide, methyl ethyl ketone peroxide or azobisisobutyronitrile is added to the mixture. Accelerators such as cobalt naphthenate can also be employed as is well known in the art.

The polyesteramides of the present invention especially when mixed with the above-described vinyl monomers provide a cross-linkable composition which, in view of its "wetting" ability and adhesiveness, is especially useful in adhesives and coatings, and as binders for the bonding of glass fibers and glass fiber laminates. When so used, it provides an effective substitute for polyester resins commonly employed for such purposes in the past.

It will also be apparent that various modifying agents such as fillers, e.g., carbon black, talc, etc. as well as heat and light stabilizers, dyes, and pigments may be incorporated into the polyesteramides without departing from the scope of the invention.

"Amine number" is used herein to refer to the value determined as follows:

Weigh out 1 to 2 g. of polyesteramide in 200 ml. Erlenmeyer flask. Add approximately 50 ml. glacial acetic acid and dissolve sample. Titrate with 0.1 N $HClO_4$ using one drop of one percent crystal violet in glacial acetic acid as indicator. Titrate to first permanent green color.

$$\text{Amine number} = \frac{10.046\ (\text{ml. } 0.1\ \text{N } HClO_4)}{\text{Grams sample}}$$

"Acid number" is used herein to refer to the value determined as follows:

Weigh out 1 to 2 g. of polyesteramide in 200 ml. Erlenmeyer flask with 25 ml. acetone. Titrate with 0.1 N alcoholic KOH using phenolphthalein indicator.

$$\text{Acid number} = \frac{5.61\ (\text{ml } 0.1\ \text{N alcoholic KOH})}{\text{Grams sample}}$$

The invention is further illustrated by the following examples; all ratios, parts and percentages in the examples, as well as in other parts of the specification and claims, are by weight unless otherwise indicated. These non-limiting examples are illustrative of certain embodiments designed to teach those skilled in the art how to practice the invention and to represent the best mode contemplated for carrying out the invention.

EXAMPLE I

This example illustrates the synthesis of a salt of the formula

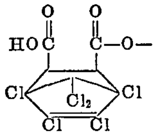

To a three-neck, 2-liter flask equipped with stirrer, thermometer, dropping funnel, and cooling bath was added 388.87 g. (1.00 mole) of chlorendic acid in 1200 ml. very dry acetone. To the above was added 43.07 g. (1.00 mole) of ethylenimine dropwise at such a rate that the temperature was 16–20° C. When about half the ethylenimine was added, the solid salt started to precipitate out. After all evidence of exotherm disappeared, the solids were filtered off and air dried at room temperature in a hood, followed by drying in a vacuum oven at ambient temperature to give a white solid, M.P. 149–150° C. yield 98.9 percent.

Amine equivalent—Calcd. for $C_{11}H_9Cl_6NO_4$: 431.91. Found: 434. Carboxyl equivalent—Calcd. for $C_{11}H_9Cl_6NO_4$ 215.95. Found: 213.

The salt was stored at 5° C. to prevent gradual rearrangement to the mono-2-aminoethyl chlorendate.

EXAMPLE II

This example illustrates the synthesis of a salt of the formula

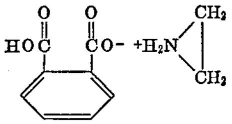

Using equipment as in Example I, 332.3 g. (2 moles) phthalic acid and 2900 ml. very dry acetone were charged to a pot. To this was added 86.1 g. (2 moles) ethylenimine, dropwise at 16–20° C. The reaction mixture was filtered to give a white solid after air and vacuum drying, at ambient temperature M.P. 94–95° C., yield 95.7 percent.

Amine equivalent—Calcd. for $C_{10}H_{11}NO_4$: 209.20. Found: 210.50. Carboxyl equivalent — Calcd. for $C_{10}H_{11}NO_4$: 104.60. Found: 102.40.

EXAMPLE III

This example illustrates the synthesis of a salt of the formula

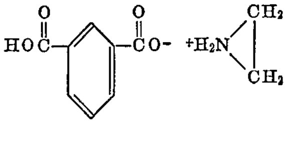

Using equipment as in Example I, 332.3 g. (2 moles) of isophthalic acid was mixed with 2500 ml. dry acetone and 500 ml. dry methanol. To this was added 86.1 g. (2 moles) ethylenimine dropwise at 16–20° C. The reaction mixture was filtered to give a white solid after ambient temperature air and vacuum drying, M.P. 100–160° C.

Amine equivalent—Calcd. for $C_{10}H_{11}NO_4$: 209.20. Found: 209.20. Carboxyl equivalent — Calcd. for $C_{10}H_{11}NO_4$: 104.60. Found: 107.40.

The above salt contained a substantial amount of impurities due to poor solubility of isophthalic acid in the acetone methanol mixture as indicated by large melting point range.

EXAMPLE IV

This example illustrates the synthesis of a salt of the formula

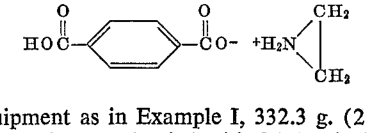

Using equipment as in Example I, 332.3 g. (2 moles) of terephthalic acid was slurried with 2500 ml. dry acetone and 500 ml. dry methanol. To this was added 86.1 g. (2 moles) ethylenimine, dropwise at 16–20° C. The reaction mixture was filtered to give a white solid after ambient temperature air and vacuum drying, M.P. 184–210° C.

Amine equivalent—Calcd. for $C_{10}H_{11}NO_4$: 209.20. Found: 234.9. Carboxyl equivalent—Calcd. for $C_{10}H_{11}NO_4$: 104.60. Found: 109.20.

The above salt contained a substantial amount of impurities due to poor solubility of the acid in the acetone-methanol mixture as indicated by the large melting point range.

EXAMPLE V

This example illustrates the synthesis of a salt of the formula

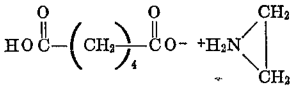

Using equipment as in Example I, 77.24 g. (0.52 mole) adipic acid was dissolved in 600 ml. dry acetone. To this was added 22.76 g. (0.52 mole) ethylenimine, dropwise at 17–23° C. The reaction mixture was filtered to give a white solid after ambient temperature air and vacuum drying, M.P. 68.5–69.0° C., yield 94.4 percent.

Amine equivalent—Calcd. for $C_8H_{15}NO_4$: 189.21. Found: 196.85. Carboxyl equivalent—Calcd. for $C_8H_{15}NO_4$: 94.60. Found: 96.65.

EXAMPLE VI

This example illustrates the synthesis of a salt of the formula

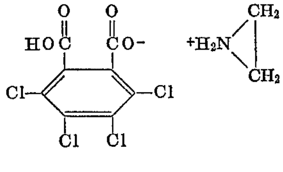

Using equipment as in Example I, 312.93 g. (1 mole) of tetrachlorophthalic acid hemihydrate was dissolved in 1750 ml. dry acetone. To this was added 43.07 g. (1 mole) ethylenimine, dropwise at 17–20° C. The reaction mixture was filtered to give a white solid after ambient temperature air and vacuum drying, M.P. 120–124° C.

Amine equivalent—Calcd. for $C_{10}H_8NO_{4.5}$: 356.0. Found: 352.0. Carboxyl equivalent—Calcd. for $C_{10}H_8NO_{4.5}$: 178.0. Found: 187.5.

EXAMPLE VII

This example illustrates the synthesis of a salt of the formula

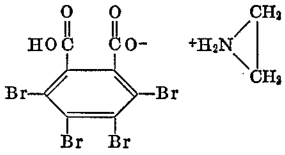

The procedure of Example VI is repeated employing the same conditions, times and ingredients except that the tetrachlorophthalic acid hemihydrate is replaced by an equimolar amount of tetrabromophthalic acid hemihydrate.

EXAMPLE VIII

Preparation of a polyesteramide using the mono salt of chlorendic acid and ethylenimine Preparation of the polyesteramide was accomplished in a conventional reactor equipped with thermometer, stirrer, full condenser, partial condenser to contain glycol vapors, nitrogen sparge and source of vacuum.

The procedure used to prepare the polyesteramide was to charge the salt and maleic anhydride to the reactor along with xylene as an azeotroping agent. Heating resulted in reaction of the solid salt with maleic anhydride as evidenced by a rapid exotherm after which stage all materials were in liquid form. This first phase of the reaction was followed by determination of the amine number defined as milligrams of perchloric acid per gram of sample. When the amine number was very low (3–5), the glycol was charged to the reactor, the temperature further elevated, and water was azeotropically distilled over as the reaction proceeded. This second phase was followed by determination of acid numbers. The reaction was run until acid number approached 25 to 50. At this point, vacuum was applied to remove excess glycol, remaining water and xylene. After this, vacuum was removed, inhibitor was added, the product was cooled and styrene was added to give a 60–70 percent solution of the polyesteramide in styrene. The final liquid product could be cured to a solid at elevated temperature using a free radical curing agent such as benzoyl peroxide or at room temperature using cobalt napthenate and methyl ethyl ketone peroxide.

A specific example follows: To the reactor, using a nitrogen blanket, was charged 566.56 g. (1.31 moles) of the chlorendic acid-ethylenimine salt along with 128.64 g. (1.31 moles) of maleic anhydride in 360 ml. xylene. Heating was started and the temperature rose to 123° C. over a 50-minute period with exotherming. Continued heating for another hour increased the temperature to 137° C. resulting in an amine number of 3.0. At this point, 56 mg. (50 p.p.m.) of mono-tertiary butyl hydroquinone (MTBHQ) was added and 104.8 g. (1.38 moles) of propylene glycol was charged to the reactor. Heating was continued for another 1.5 hours until the temperature rose to 155 C., resulting in an acid number of 55 and an amine number of 2.3. Vacuum (34 mm.) was applied and any remaining water, excess glycol, or xylene were distilled over resulting in an amine number of 3.4 and an acid number of 37. The vacuum was removed, 224 mg. (200 p.p.m.) of toluhydroquinone (THQ) was added and the reaction product cooled to 112° C. at which point 357 g. of styrene was added to make a 68 percent solution of the polyesteramide in styrene. The final product was filtered resulting in a light orange colored liquid.

EXAMPLE IX

Preparation of a polyesteramide using the mono salt of phthalic acid and ethylenimine This polyesteramide was made using a different anhydride-glycol mole ratio and also different order of addition of reactants than in Example VIII.

To a reactor, as in Example VIII, was charged 50 ml. xylene, 168.16 g. (1.58 moles) diethylene glycol, 157.84 g. (0.75 mole) phthalic acid-ethylenimine salt, 74.00 g. (0.75 mole) maleic anhydride and 55 mg. (100 p.p.m.) 2,6-di-tert-butyl-4-methylphenol antioxidant. Using a nitrogen blanket, the reactor was heated to 110° C. over a 40-minute period at which time the reaction mixture was a light yellow liquid. Continued heating to 178° C. over a 3-hour period resulted in a material having an acid number of 39.9. Vacuum (35 mm.) was applied and the remaining water, glycol, and xylene were distilled over. Vacuum was removed, the polyesteramide was cooled to 95° C., 110 mg. (200 p.p.m.) Shell Ionol added, and 182 ml. styrene added to yield a 69.6 percent solids solution of the polyesteramide in styrene. Final acid number was 23 and the amine number was 8.

EXAMPLE X

Preparation of polyesteramide using the mono salt of adipic acid and ethylenimine To a reactor, as in Example VIII, was charged 90.24 g. (1.19 moles) propylene glycol, 50 ml. xylene, 204.04 g. (1.08 moles) of adipic acid-ethylenimine salt, and 105.72 g. (1.08 moles) maleic anhydride. Using a nitrogen blanket, the reactor was heated to 120° C. with exotherming over a 30-minute period. Heating was continued to 168° C. over a 2.5-hour period. Vacuum (35 mm.) was applied and the remaining glycol, water, and xylene distilled over. The vacuum was removed, the pot cooled to 105° C., 58 mg. (100 p.p.m.) toluhydroquinone (THQ), and 193 ml. styrene added to yield a 68 percent solids solution of the polyesteramide in styrene. Final acid number was below 56. The styrene adequately dissolved the polyesteramide at 105° C., but partially separated on cooling.

EXAMPLE XI

Preparation of polyesteramide using the mono salt of tetrachlorophthalic acid and ethylenimine To a reactor, as in Example VIII, was charged 59.84 g. (0.79 mole) propylene glycol, 250 ml. xylene, 266.72 g. (0.75 mole) of the tetrachlorophthalic acid-ethylenimine salt, and 73.44 g. (0.75 mole) maleic anhydride. Using a nitrogen blanket, the reactor was heated to 150° C. over a 4-hour period at which point the acid number was 50. One gram of PbO was added as a catalyst and heating continued for 3.5 hours with temperature rise to 172° C. while under vacuum (28 mm.). Vacuum was removed, the reaction mixture was cooled to 130° C., 58 mg. toluhydroquinone (THQ) added, and cooling continued to 100° C. Styrene (172 ml.) was added to yield a 70 percent solids solution of the polyesteramide in styrene.

EXAMPLE XII

Preparation of polyesteramide using mono salt of chlorendic acid and ethylenimine and neopentyl glycol To a reactor, as in Example VIII, was charged 250 ml. xylene, 92.04 g. (0.94 mole) of maleic anhydride, 8.3 g. of tris(2-chloroethyl) phosphite and 405.36 g. (0.94 mole) of the mono salt of chlorendic acid and ethylenimine. Using a nitrogen blanket, the reactor was heated to 116° C. with exotherming over a 0.75-hour period at which stage all reactants were in liquid form. Continued heating to 132° C. over a 3-hour period resulted in a product with an amine number of 2.1. At this point, 102.60 g. (0.98 mole) of 96 percent neopentyl glycol was added to the reactor. Continued heating to 153° C. over a 2.3-hour period resulted in a product with an acid number of 50. Vacuum (3–6 mm.) was applied and any excess water, glycol and xylene distilled off. The vacuum was removed and the product cooled to 135° C. Mono tertiary butylhydroquinone 30 mg. (50 p.p.m.) was added at 135° C. At 115° C., 120 mg. (200 p.p.m.) toluhydroquinone was added. At 108° C., 271 ml. of styrene was added to yield a 70 percent solids solution of the polyesteramide in styrene.

EXAMPLE XIII

Preparation of polyesteramide using mono salt of chlorendic acid and ethylenimine and ethylene glycol To a reactor, as in Example VIII, was charged 40 ml. xylene, 57 mg. (100 p.p.m.) tertiary butyl catechol (TBC), 64.28 g. (1.04 moles) ethylene glycol, 46.76 g. (0.22 mole) trimethylol propane diallyl ether and 53.48 g. (0.55 mole) maleic anhydride. Using a nitrogen blanket the reactor was heated to 96° C. over a 0.8-hour period. At this point, 235.48 g. (0.55 mole) of the chlorendic acid-ethylenimine salt was added. Exotherming started and heating was continued until the temperature rose to 137° C. over a 2.5-hour period where the acid number was 43. Vacuum (42 mm.) was applied and any excess water, glycol, ether, and xylene was distilled off. The vacuum was removed and the product cooled to 68° C. TBC 114 mg. (200 p.p.m.) plus 188 ml. of styrene was added to yield a 67.2 percent solids solution of the polyesteramide in styrene. Final acid number was 28 and the amine number was 4.9.

EXAMPLE XIV

Preparation of polyesteramide using mono salt of chlorendic acid and ethylenimine and 2-butene-1,4-diol To a reactor, as in Example VIII, was charged 250 ml. xylene, 8.3 g. tris(2-chloroethyl) phosphite, 94.56 g. (0.96 mole) maleic anhydride and 416.32 g. (0.96 mole) chlorendic acid-ethylenimine salt. Using a nitrogen blanket, the reactor was heated with exotherming to 118° C. over a one-hour period where all reactants were in liquid form. Continued heating to 133° C. over a 3.3-hour period gave a product with an amine number of 3.8. Butenediol 89.16 g. (1.01 moles) was added. Further heating to 153° C. over a 2.1-hour period yielded a product with an acid number of 52. Pressure was reduced to 23 mm. Hg and any excess water, glycol, or xylene was distilled off. After restoring atmospheric pressure the product was cooled to 140° C. where 63 mg. (75 p.p.m.) mono tertiary butyl hydroquinone was added. At 120° C., 211 mg. (250 p.p.m.) toluhydroquinone was added. At 112° C., 269 ml. styrene was added yielding a 70 percent solids solution of polyesteramide in styrene.

EXAMPLE XV

Preparation of a polyesteramide using mono salt of chlorendic acid and ethyleneimine and 1,6-hexane diol To a reactor, as in Example VIII, using a nitrogen blanket, were charged 134.62 g. (1.13 moles) of 1,6-hexane diol and 101.55 g. (1.03 moles) of maleic anhydride in 300 ml. xylene. With stirring, 298.20 g. (0.69 moles) of chlorendic acid-ethylenimine salt were added. Heating was started and the temperature rose to 180° C. over a 3½ hour period resulting in an acid number of 40.9, and an amine number of 7.5. Vacuum (3 mm.) was applied and any remaining water, glycol, and xylene distilled over. Vacuum was removed and, at 165° C. or lower, the molten resin was transferred to 193 g. styrene containing 135 mg. toluhydroquinone yielding 673 g. of a 71.25 percent solution of the polyesteramide in styrene. Final acid number was 24.0; final amine number was 5.7; and molecular weight was 985.

A sample of the liquid resin was cured for one hour at 150° C. (using 0.2 percent cobalt naphthenate and 2 percent Lupersol DDM methyl ethyl ketone peroxide solution) to a solid which was fractured by dropping a 2 lb. weight from a height of 17 inches using a dropping weight impact tester. A similar resin made from propylene glycol instead of hexane diol would have a molecular weight in the range 650–800, fracturing under impact at 2 to 4 inches.

EXAMPLE XVI

Preparation of a polyesteramide using mono salt of chlorendic acid and ethyleneimine, 1,6-hexane diol and 1,3-butane diol Using apparatus as in Example VIII, 76.05 g. (0.64 mole) 1,6-hexane diol, 38.62 g. (0.42 mole) 1,3-butane diol, and 95.55 g. (0.97 moles) maleic anhydride were charged under a nitrogen blanket to 250 ml. xylene in the reactor. With stirring, 336.82 g. (0.77 moles) chlorendic acid-ethyleneimine salt were added. Heating was started with exotherming to about 113° C. over a 30 minute period. The temperature rose to 159° C. over a 3½ hour period where the acid number was 34.3 and the amine number 6.6. Vacuum (3 mm.) was applied and any remaining water, glycol, and xylene distilled over. Vacuum was removed and, at 150° C. or lower, the molten resin was transferred to 227 g. styrene containing 140 mg. toluhydroquinone yielding 839 g. of a 72.94 percent solution of the polyesteramide in styrene. A sample was cured for 48 hours at room temperature using 0.3 percent cobalt naphthenate and 3 percent Lupersol DDM methyl ethyl ketone peroxide solution. Final acid number was 25.0; final amine number was 6.0; molecular weight was 915 and impact (2 lb. wt.) in., was 12.

EXAMPLE XVII

Preparation of a polyesteramide using mono salt of chlorendic acid and ethyleneimine and dimer acid (Empol 1024)

Using apparatus as in Example VIII, 95.12 g. (1.25 moles) propylene glycol, 105.04 g. (1.07 moles) maleic anhydride, and 68.16 g. (0.10 moles) dimer acid were charged under a nitrogen blanket to 325 ml. xylene in the reactor. With stirring and heating, the temperature rose to 190° C. over a 12 hour period. Cooling to 47° C., 308.56 g. (0.71 moles) chlorendic acid-ethyleneimine salt were added. The temperature rose to 145° C. over a 5 hour period yielding an acid number of 23.3 and an amine number of 8.8. Vacuum (6 mm.) was applied and any remaining water, glycol, and xylene distilled over. Vacuum was removed and, at 144° C. or lower, the molten resin was transferred to 210 g. styrene containing 150 mg. toluhydroquinone yielding 755 g. of a 72.19 percent solution of the polyesteramide in styrene. A sample was cured for 48 hours at room temperature using 0.2 percent cobalt naphthenate and 3 percent Lupersol DDM methyl ethyl ketone peroxide solution. Final acid number was 19.6; final amine number was 8.5; molecular weight was 993; and impact (2 lb.) in., was 12.

EXAMPLE XVIII

Preparation of a polyesteramide using mono salt of chlorendic acid and ethyleneimine, 1,6-hexane diol and propylene glycol Using apparatus as in Example VIII, 239.94 g. (2.03 moles) 1,6-hexane diol, 51.48 g. (0.67 mole) propylene glycol, and 248.94 g. (2.53 moles) maleic anhydride were charged under a nitrogen blanket to 500 ml. xylene in the reactor. With stirring, 730.98 g. (1.69 moles) chlorendic acid-ethyleneimine salt were added. On heating, exotherming occurred to 113° C. over a 30 minute period. Five grams of tris(2-chlorethyl) phosphite were added. Heating was continued and the temperature rose to 162° C. over a 10 hour period. Vacuum (6 mm.) was applied and any remaining water, glycol, and xylene distilled over. Vacuum was removed and, at 162° C. or lower, the molten resin was transferred to 500 g. styrene containing 255 mg. toluhydroquinone yielding 1709 g. of a 70.63 percent solution of the polyesteramide in styrene. A sample was cured for 48 hours at room temperature using 0.4 percent cobalt naphthenate and 2 percent Lupersol DDM methyl ethyl ketone peroxide solution. Final acid number was 38.0; final amine number 5.0; molecular weight was 1235; percent chlorine was 23.42 and impact (2 lb.) in., was 17.

EXAMPLE XIX

Preparation of a polyesteramide whereby the chlorendic acid-ethyleneimine salt is reacted with chlorendic acid to form in situ the diacid of the formula

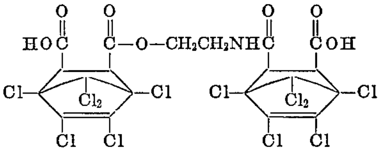

Using apparatus as in Example VIII, 218.34 g. (0.56 mole) chlorendic acid were charged under a nitrogen blanket to 300 ml. xylene in the reactor followed by 242.46 g. (0.56 mole) chlorendic acid-ethyleneimine salt. Heating and stirring was applied over a 1½ hour period and the temperature rose to 114° C., the diacid of the above shown formula being formed. At this point 111.09 g. (1.45 moles) propylene glycol were added. After 30 minutes heating at 115 to 120° C., 82.61 g. (0.84 moles) maleic anhydride were added. Six-tenths gram of stannous oxalate and 0.5 g. zinc acetate were added. Heating and stirring were continued until the temperature rose to 162° C. over a 12 hour period. The acid number was 34. Vacuum (5 mm.) was applied and remaining water, glycol, and xylene distilled over. Vacuum was removed and, at 160° C. or lower, the molten resin was transferred to 250 g. styrene containing 130 mg. toluhydroquinone yielding 880 g. of a 71.60 percent solution of the polyesteramide in styrene. A sample was cured for 18 hours at room temperature using 0.3 percent cobalt naphthenate and 2 percent Lupersol DDM methyl ethyl ketone peroxide solution. Final acid number was 24.3; final amine number was 2.7; molecular weight was 1314; and impact (2 lb.) in., was 25 (approx.).

Using this method it was noted that a precipitate tended to settle out on storing at room temperature, probably due to partial resin insolubility in styrene.

The polyesteramide prepared in this example is believed to be recurring units of the formula

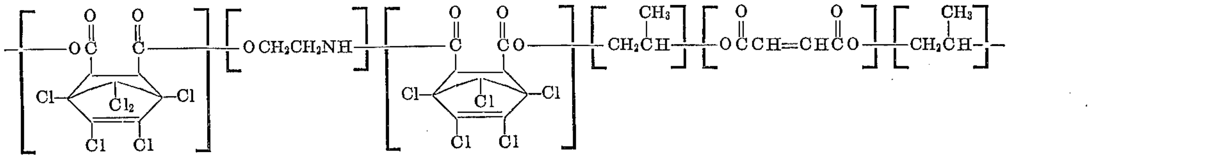

EXAMPLE XX

Fiber glass laminates made with polyesteramides

The polyesteramide made in Example VIII was used as the binder in 12" x 12" x ⅛" fiber glass laminates. One laminate (#1) was made using 12 plies of type 181 glass cloth treated with methacrylato chromic chloride in isopropanol (du Pont's "Volan A"). Another laminate (No. 2) was made using 12 plies of untreated type 181 glass cloth. A third laminate (No. 3) was made with 12 plies of Volan A treated type 181 glass cloth using a polyester resin made of equivalent amounts of chlorendic acid as compared to the chlorendic acid-ethylenimine salt used in the first two laminates. Data on the three laminates follows:

| | Tensile strength, p.s.i. | Modulus, p.s.i. | Resin content, percent | Chlorine content, percent | | Cloth |
|---|---|---|---|---|---|---|
| | | | | Resin | Laminate | |
| Laminate number: | | | | | | |
| 1 | 35,381 | $2.95\times10^6$ | 43.34 | 25.80 | 11.18 | Treated. |
| 2 | 42,124 | $2.69\times10^6$ | 42.49 | 25.80 | 10.96 | Untreated. |
| 3 | 40,163 | $3.08\times10^6$ | 40.60 | 25.18 | 10.22 | Treated. |

It has been observed in our work that qualitatively polyesteramides have good adhesion to glass. Polyesters do not have good adhesion except to specially treated glass coated with a coupling agent such as du Pont's Volan A. Comparison of laminates #1, #2, and #3 shows that tensile properties are approximately the same and that addition of the amide group is not deleterious.

The laminates were prepared by the hand lay-up method. Curing of the resin was accomplished with 2.5 percent Lupersol DDM initiator (60% methyl ethyl ketone peroxide in dimethyl phthalate) and 0.3 percent "Uversol Cobalt Liquid 6 Percent." Curing was effected at room temperature in a press at 460 p.s.i. for 16 hours, followed by a post cure for 8 hours in an oven at 150° F.

Fiber glass laminates were also made from resins made with phthalic acid-ethylenimine salt and also neopentyl glycol.

Comparison: This comparative run illustrates the synthesis of the ethyleneimine salt of oxalic acid of the formula:

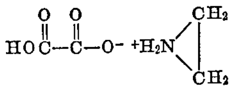

The preparation of the salt of the above formula has been known since before the turn of the century and is described in 28 Berichte 2929 (1895).

Using the general procedure of Example I, 270.12 grams (3.00 moles) anhydrous oxalic acid was dissolved in 3000 ml. dry acetone. To this solution was added 129.21 grams (3.00 moles) ethyleneimine, dropwise at 15–19° C. After complete reaction, the solid reaction product was filtered off and dried at room temperature in a hood to give a white solid, M.P. 102–103.5 with foaming, in a 98.2 percent yield.

Amine equivalent—Calcd. for $C_4H_7NO_4$: 133.11. Found: 134.10. Carboxyl equivalent—Calcd. for $C_4H_7NO_4$: 66.55. Found: 73.13.

The salt was then used to synthesize a polyesteramide. This polyesteramide has the undesirable property of being insoluble in styrene.

To a reactor described in Example VIII, the reactants were charged as in Example X. The charge consisted of 205.04 grams (1.54 moles) of the salt, 151.04 grams (1.54 moles) of maleic anhydride, 123.04 grams (1.62 moles) propylene glycol and 250 ml. xylene. Using a nitrogen blanket the reactor was heated to 119° C. with exotherming over a 90 minute period. Heating was continued to 155° C. over a 3 hour period, at which time vacuum (6 mm. Hg) was applied and the remaining glycol, water and xylene distilled over. After 45 minutes the vacuum was removed and provisions were made to transfer the molten polyesteramide into a styrene solution containing 140 mg. toluhydroquinone (200 p.p.m. THQ). Upon attempting to dissolve the polyesteramide in styrene it was found that the polyesteramide was totally insoluble in styrene at all temperatures up to 120° C. At this temperature attempts to effect solution were terminated.

The insolubility of this polyesteramide in styrene renders it useless in the preparation of styrene cross-linked polyesteramides.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

We claim:

1. A process for producing polyesteramides comprising coreacting:

(A) at least one member of the group consisting of a salt of the formula

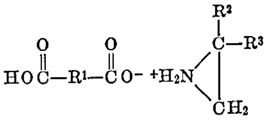

and a diacid of the formula

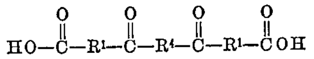

wherein:

$R^1$ is free of non-benzenoid unsaturation and is selected from the group consisting of alkylene of up to 15 carbon atoms, arylene of up to 12 carbon atoms, and aralkylene of up to 15 carbon atoms, wherein one or all of the hydrogen atoms thereof can be substituted with one or more members selected from the group consisting of F, Cl, Br, lower alkyl and lower alkoxy; $R^2$ and $R^3$ are independently selected from the group consisting of hydrogen, alkyl of from 1 to 15 carbon atoms, phenyl and benzyl; and $R^4$ is aminoalkyleneoxy or oxyalkenyleneamino;

(B) an alpha-beta ethylenically unsaturated dicarboxylic acid or an acid anhydride thereof; and (C) at least one polyhydric compound selected from the group consisting of castor oil and dihydric alcohols having from 2 to 6 carbon atoms.

2. A process according to claim 1 wherein the polyhydric compound is castor oil.

3. A process of claim 1 for producing polyesteramides comprising coreacting:

(A) a salt of the formula

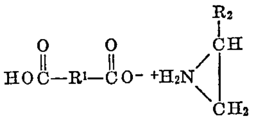

wherein $R^1$ is phenylene wherein one or all of the hydrogen atoms thereof can be substituted with one or more members selected from the group consisting of F, Cl, Br, lower alkyl and lower alkoxy; and $R^2$ is hydrogen or methyl;

(B) an alpha-beta ethylenically unsaturated dicarboxylic acid or an acid anhydride thereof; and (C) castor oil or a dihydric alcohol having from 2 to 6 carbon atoms.

4. A process of claim 1 for producing polyesteramides comprising coreacting:

(A) a salt of the formula:

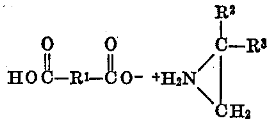

wherein:

$R^1$ is tetrachlorophenylene, tetrabromophenylene or

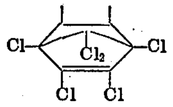

and $R^2$ is hydrogen or methyl;

(B) an alpa-beta ethylenically unsaturated dicarboxylic acid or an acid anhydride thereof; and (C) a dihydric alcohol having from 2 to 6 carbon atoms.

5. A process according to claim 4 wherein the dihydric alcohol is 1,6-hexane diol.

6. A process according to claim 5 further comprising reacting 1,3-butane diol therewith.

7. A process of claim 1 for producing polyesteramides comprising coreacting:

(A) a salt of the formula:

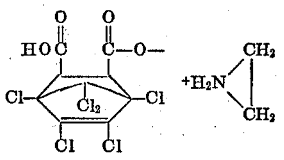

(B) maleic acid or an acid anhydride thereof; and (C) a dihydric alcohol selected from the group consisting of alkane diols having from 5 to 6 carbon atoms.

8. A process according to claim 7 further comprising reacting dimer acid therewith.

9. A process according to claim 7 wherein the dihydric alcohol is 1,6-hexane diol and wherein the process further comprises reacting propylene glycol therewith.

10. A process of claim 1 for producing polyesteramides comprising coreacting:

(A) a salt of the formula:

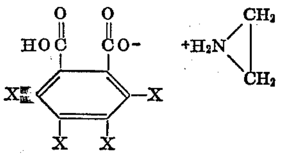

wherein X is Cl or Br;

(B) maleic acid or an acid anhydride thereof; and (C) a dihydric alcohol selected from the group consisting of alkane diols having from 5 to 6 carbon atoms.

11. The process of claim 1 wherein the coreacting is conducted at a temperature of −20 to 200° C. and wherein the molar ratio of B:C 15:10 to 10:15 and the molar ratio of A:B is 10:1 to 1:10.

12. The process of claim 1 wherein the molar ratio of B:C is 11:10 to 10:11 and the molar ratio of A:B is 3:1 to 1:3 and wherein the salt, the acid and the alcohol are coreacted simultaneously to produce a random polyesteramide.

13. A process of claim 1 for producing polyesteramides comprising simultaneously coreacting:

(A) a salt of the formula:

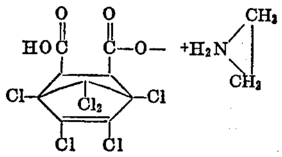

(B) maleic acid or an acid anhydride thereof; and (C) 1,6-hexane diol, at a temperature of 40° C. to 180° C. wherein the molar ratio of B:C is 11:10 to 10:11; wherein the molar ratio of A:B is 3:1 to 1:3 until the acid number of the reaction mixture has decreased to a value less than 50 and the amine number has decreased to a value less than 10.

14. A process of claim 1 for producing polyesteramides comprising coreacting:

(A) a diacid of the formula:

$$HO\overset{O}{\overset{\|}{C}}-R^1-\overset{O}{\overset{\|}{C}}-R^4-\overset{O}{\overset{\|}{C}}-R^1-\overset{O}{\overset{\|}{C}}O$$

wherein:

$R^1$ is tetrachlorophenylene, tetrabromophenylene or

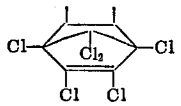

and $R^4$ is aminoethyleneoxy, oxyethyleneamino, aminoisopropyleneoxy or oxyisopropyleneamino;

(B) an alpha-beta ethylenically unsaturated dicarboxylic acid or an acid anhydride thereof; and (C) a dihydric alcohol having from 2 to 6 carbon atoms.

15. A process according to claim 14 wherein the dihydric alcohol is propylene glycol.

16. A process according to claim 15 further comprising reacting 1,6-hexane diol therewith.

17. A process of claim 1 for producing polyesteramides comprising coreacting:

(A) a diacid of the formula:

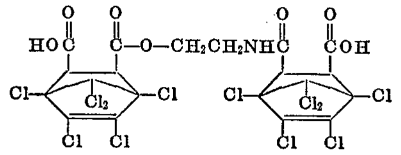

(B) maleic acid or an acid anhydride thereof; and (C) a dihydric alcohol having from 2 to 6 carbon atoms.

18. A process according to claim 17 wherein the coreacting is conducted at a temperature of −20° C. to 200°C. and wherein the molar ratio of B:C is 15:10 to 10:15, and the molar ratio of A:B is 10:1 to 1:10.

19. A process of claim 1 for producing polyesteramides comprising simultaneously coreacting:

(A) a diacid of the formula:

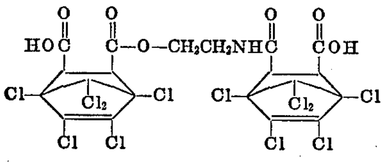

(B) maleic acid or an acid anhydride thereof; and (C) a dihydric alcohol selected from the group consisting of alkane diols having from 5 to 6 carbon atoms, at a temperature of 40° to 180° C. wherein the molar ratio of B:C is 11:10 to 10:11; wherein the molar ratio of A:B is 3:1 to 1:3 until the acid number of the reaction mixture has decreased to a value less than 50 and the amine number has decreased to a value less than 10.

20. A process of claim 1 for producing polyesteramides comprising (I) reacting:

(A) a salt of the formula:

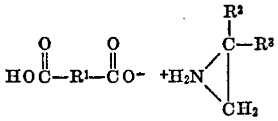

wherein $R^1$ is free of non-benzenoid unsaturation and is selected from the group consisting of alkylene of up to 15 carbon atoms, arylene of up to 12 carbon atoms, and aralkylene of up to 15 carbon atoms, wherein one or all of the hydrogen atoms thereof can be substituted with one or more members selected from the group consisting of F, Cl, Br, lower alkyl and lower alkoxy; and wherein $R^2$ and $R^3$ are independently selected from the group consisting of hydrogen, alkyl of from 1 to 15 carbon atoms, phenyl and benzyl;

(B) an acid of the formula $$HO\overset{O}{\overset{\|}{C}}-R^1-\overset{O}{\overset{\|}{C}}OH$$

wherein $R^1$ has the meaning given above to yield a resulting reaction product comprising a diacid of the formula $$HO-\overset{O}{\overset{\|}{C}}-R^1-\overset{O}{\overset{\|}{C}}-R^4-\overset{O}{\overset{\|}{C}}-R^1-\overset{O}{\overset{\|}{C}}OH$$

wherein $R^1$ has the meaning given above and wherein $R^4$ is aminoalkyleneoxy or oxyalkyleneamino; and (II) coreacting the resulting reaction product of step (I) with (C) an alpha-beta ethylenically unsaturated dicarboxylic acid or an acid anhydride thereof; and (D) at least one polyhydric compound selected from the group consisting of castor oil and dihydric alcohols having from 2 to 6 carbon atoms.

21. A process according to claim 20 wherein $R^1$ is tetrachlorophenylene, tetrabromophenylene or

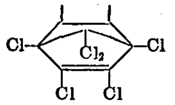

and wherein $R^4$ is aminoethyleneoxy, oxyethyleneamino, aminoisopropyleneoxy or oxyisopropyleneamino; and wherein the polyhydric compound is a dihydric alcohol having from 2 to 6 carbon atoms.

22. A process of claim 1 for producing polyesteramides comprising (I) reacting under substantially oxygen-free conditions at a temperature of 40° to 180° C.

(A) a salt of the formula

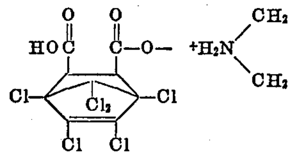

and (B) an acid of the formula

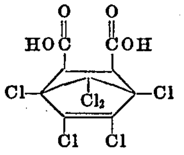

to yield a resulting reaction product comprising a diacid of the formula

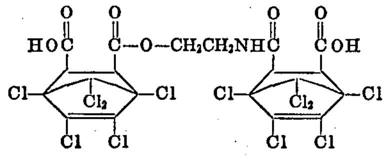

and (II) coreacting under substantially oxygen-free conditions at a temperature of 40° to 180° C. the resulting reaction product of step (I) with (C) maleic acid or an acid anhydride thereof; and (D) a dihydric alcohol having from 2 to 6 carbon atoms, to yield a polyesteramide.

23. A process according to claim 22 wherein the coreaction of step (II) is conducted until the acid number of the reaction mixture has decreased to a value less than 50 and the amine number has decreased to a value less than 10.

24. A polyesteramide consisting essentially of repeating units represented by the structural formula $$-\left[O\overset{O}{\overset{\|}{C}}-R^1-\overset{O}{\overset{\|}{C}}\right]-\left[R^4\right]-\left[\overset{O}{\overset{\|}{C}}-R^1-\overset{O}{\overset{\|}{C}}O\right]-\left[R^6\right]-\left[O\overset{O}{\overset{\|}{C}}-R^5-\overset{O}{\overset{\|}{C}}O\right]-\left[R^6\right]-$$

wherein:

$R^1$ is free of non-benzenoid unsaturation and is selected from the group consisting of alkylene of up to 15 carbon atoms, arylene of up to 12 carbon atoms, and aralkylene of up to 15 carbon atoms, wherein one or all of the hydrogen atoms thereof can be substituted with one or more members selected from the group consisting of F, Cl, Br, lower alkyl and lower alkoxy;

$R^4$ is aminoalkyleneoxy or oxyalkyleneamino;

$R^5$ is alpha-beta ethylenically unsaturated alkylidene; and $R^6$ is alkylene or alkylidene.

25. A polyesteramide of claim 24 of the formula $$-\left[O\overset{O}{\overset{\|}{C}}-R^1-\overset{O}{\overset{\|}{C}}\right]-\left[R^4\right]-\left[\overset{O}{\overset{\|}{C}}-R^1-\overset{O}{\overset{\|}{C}}O\right]-\left[R^6\right]-\left[O\overset{O}{\overset{\|}{C}}-R^5-\overset{O}{\overset{\|}{C}}O\right]-\left[R^6\right]-$$

wherein:

$R^1$ is tetrachlorophenylene, tetrabromophenylene or $R^4$ is $$-NHCH_2-\overset{R^7}{\overset{|}{C}}HO-\text{or}-O\overset{R^7}{\overset{|}{C}}HCH_2NH-$$

wherein $R^7$ is

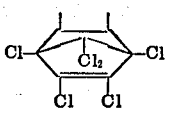

hydrogen or lower alkyl;

$R^5$ is $$-CH{=}\overset{R^8}{\overset{|}{C}}-\text{or}-\overset{R^8}{\overset{|}{C}}{=}CH-$$

wherein $R^8$ is hydrogen or lower alkyl; and $R^6$ is lower alkylene or lower alkylidene.

26. A polyesteramide of claim 24 consisting essentially of repeating units represented by the structural formula:

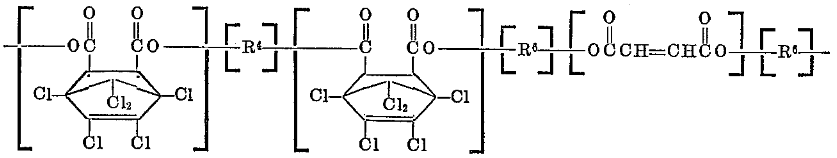

wherein:

$R^4$ is $$-NOCH_2-\overset{R^7}{\overset{|}{C}}HO-\text{or}-O\overset{R^7}{\overset{|}{C}}HCH_2NH-$$

wherein $R^7$ is hydrogen or methyl; and $R^6$ is lower alkylene or lower alkylidene having from 2 to 6 carbon atoms.

References Cited

UNITED STATES PATENTS

| | | | |
|---|---|---|---|
| 2,806,822 | 9/1957 | Ott | 260—2.5 N |
| 3,354,126 | 11/1967 | Ham et al. | 260—78 R |
| 3,538,058 | 11/1970 | Goodman et al. | 260—75 N |
| 3,642,712 | 2/1972 | Sambeth et al. | 260—78 R |

DONALD E. CZAJA, Primary Examiner

R. W. GRIFFIN, Assistant Examiner

U.S. Cl. X.R.

117—122 R, 126 GR, 161 K; 161—194; 260—2 EN, 75 N, 78 R, 468 R, 475 R, 485 J, 870

UNITED STATES PATENT OFFICE
CERTIFICATE OF CORRECTION

Patent No. 3,772,229 Dated November 13, 1973

Inventor(s) Christena et al

It is certified that error appears in the above-identified patent and that said Letters Patent are hereby corrected as shown below:

IN THE CLAIMS

Column 17, line 55, delete the formula and insert --

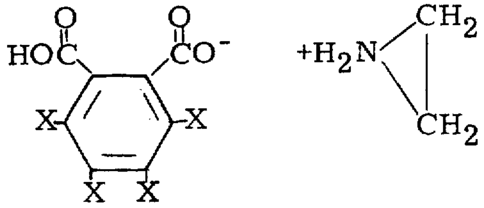

--

Column 17, line 69, after "B:C" insert -- is -- .

Column 20, line 5, delete the formula and insert --

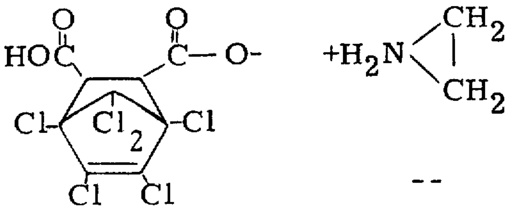

--

Column 20, line 9, delete "and".

Column 22, line 5, delete the formula and insert --

$$-NHCH_2-\overset{R^7}{\overset{|}{C}}HO- \quad \text{or} \quad -O\overset{R^7}{\overset{|}{C}}HCH_2NH-$$

Signed and sealed this 23rd day of April 1974.

(SEAL)
Attest:

EDWARD M. FLETCHER, JR.
Attesting Officer

C. MARSHALL DANN
Commissioner of Patents